J. G. MacDONALD & W. F. C. MacKAY.
WATER SAVING SYSTEM.
APPLICATION FILED MAY 22, 1912.
1,073,862.
Patented Sept. 23, 1913.
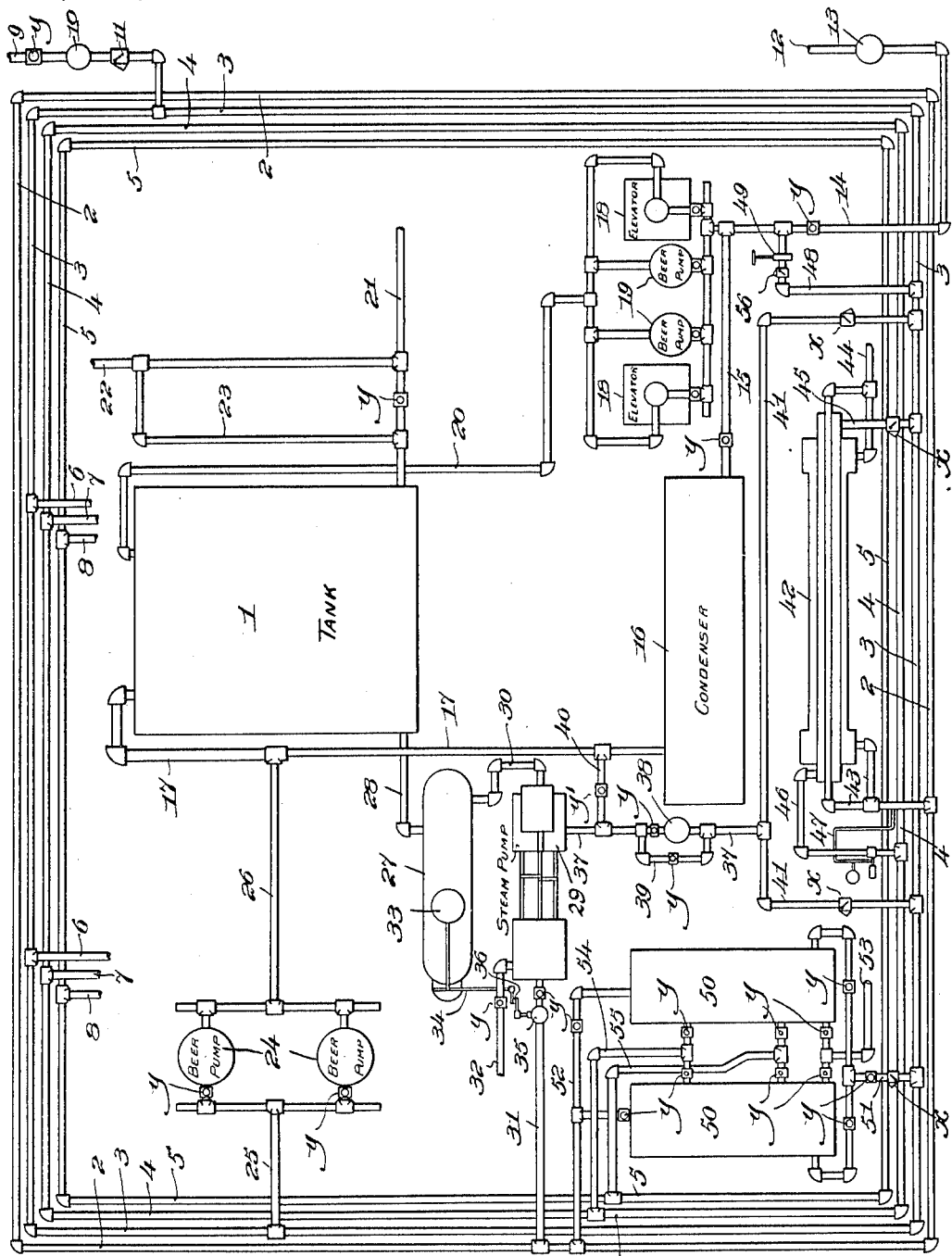
Witnesses:
Daisy Clark
Jas. F. Bowen.
Inventors,
James G. MacDonald,
William F. C. MacKay,
by Wright Brown Quimby May
Attys.

UNITED STATES PATENT OFFICE.

JAMES G. MacDONALD AND WILLIAM F. C. MacKAY, OF BOSTON, MASSACHUSETTS.

WATER-SAVING SYSTEM.

1,073,862.

Specification of Letters Patent.  Patented Sept. 23, 1913.

Application filed May 22, 1912. Serial No. 699,060.

*To all whom it may concern:*

Be it known that we, JAMES G. MacDONALD and WILLIAM F. C. MacKAY, both citizens of the United States, and residents of Boston, in the county of Suffolk and State of Massachusetts, have invented certain new and useful Improvements in Water-Saving Systems, of which the following is a specification.

This invention relates to the conservation of water, especially in large buildings such as hotels which utilize water in many ways such as for the condenser of an ice-making plant, elevators, and beer pumps. The elevators referred to are more particularly of the type which utilizes the city pressure for acting directly upon the elevator plunger. Such apparatus usually discharges waste water into the sewer. As the water from such apparatus is not usually contaminated in any way such as would prevent its use for other purposes such as for bathing, to discharge such water into the sewer results in pure waste.

The object of the present invention is to provide a system which will enable the waste water from such apparatus as mentioned to be utilized in place of water coming directly from the supply mains, thereby effecting a large saving in expense especially where the cost of water is determined by a meter service.

To these ends our invention consists in employing in connection with a water service pipe having a meter, a receptacle for the outflow from apparatus of various kinds which employ water, and a pump for forcing the water from said receptacle back into the system pipes, means being provided for preventing the water from being pumped back into the service pipe.

By the term "hydraulic apparatus," hereinafter employed, we mean to include any device, appliance, or machine which employs water and from which the waste water would ordinarily be discharged into a sewer. If it be desired to re-utilize water which has become contaminated more or less in its utilizing apparatus, a suitable filter may be employed.

The accompanying drawing is a diagrammatic representation of the entire system constructed to re-utilize the waste water from an ice machine condenser, elevators and beer pumps. Since the details of the system such as the check valves, meters, controlling valves or regulators may be of any well known or preferred construction, we do not attempt to illustrate the specific structure of any of such mentioned parts.

In the basement of the building, or at any point low enough to receive by gravity the discharge water from the various apparatus, we employ a tank or receptacle 1, of considerable capacity. Steam pipes 2, cold water pipes 3, hot water pipes 4, and circulating piping 5, are represented in the diagram as of rectangular arrangement but it is to be understood that all such piping may be arranged in whatever may be the most convenient form to connect the various other elements of the system. The piping 5 is for the usual purpose for insuring a slow circulation of hot water throughout the building for such purposes as to enable hot water to be drawn immediately from any faucet intended to supply such.

At 6, 7 and 8 we indicate respectively cold water, hot water, and circulation piping leading to the various rooms such as those having bathing apparatus and from which rooms of course the waste water will be discharged as usual into the sewer.

The supply main 9 having a city meter 10 and a check valve 11, is intended for low pressure service such as 45 pounds. Another supply main 12 for high pressure service such as 90 pounds is connected to the system through a meter 13. A pipe 14 leads from the meter 13 and connects by means of a pipe 15 to the condenser 16 of an ice-making apparatus. From said condenser the water passes through pipe 17, by gravity, to the tank or receptacle 1.

A couple of elevators of the plunger type are indicated diagrammatically at 18 and a couple of beer pumps are indicated diagrammatically at 19. A header pipe connected with pipe 14 is connected to supply the apparatus 18 and 19, and from said apparatus, through a header pipe and a pipe 20 the discharge leads by gravity into the tank or receptacle 1. From said tank or receptacle a discharge pipe 21 may lead to the sewer for use if it is desired to empty the tank. A vent pipe 22 leads from the pipe 21 and a connecting pipe 23 from pipe 21 to the pipe 22 provides for overflow from the tank 1 to the sewer through the pipe 21. Of course the service pressure for the elevators 18 is high, and incidentally the pressure for the beer pumps 19 is also high. In some hotels there are high pressure beer pumps and low pressure beer pumps. In the drawing we illustrate diagrammatically low pressure beer pumps 24 connected by a pipe 25 with the cold water pipe 3 which receives pressure from low pressure service pipe 9. A discharge from the pumps 24 is provided for by a pipe 26 leading to the pipe 17.

We will now describe the mechanism illustrated diagrammatically for returning the water from tank 1 into the system, and for automatically controlling such return. A closed tank 27 is connected by a pipe 28 with the bottom of the tank 1. The pump cylinder of the steam pump 29 is connected by pipe 30 with the tank 27. A steam pipe 31 supplies steam from the system steam pipe 2, to the steam cylinder of the pumping apparatus. The exhaust pipe from the steam cylinder is indicated at 32. A float 33 in the tank 27 has its stem or rod connected to a rock shaft 34, said rock shaft having an arm connected to a steam valve 35 by means of a link 36 so that the rise and fall of the float 33 in tank 27 will open or close the steam controlling valve 35. The pump cylinder of the steam pump delivers through pipe 37, which may include a filter 38 and a by pass 39. The valve-controlled pipe 40 connects the pipes 37 and 17, the valve $y'$ in this pipe being a relief valve to prevent excessive pressure in the system under the action of the pump. If the relief valve opens due to excessive pressure, the pump simply circulates the water, discharging the excess into tank 1. A pipe 41 is connected to the pipe 37 and is branched and connects at two points with the cold water pipe 3 so that the water from said pump and which has been drawn from tank 1 may be sent into the system pipe 3.

A heater of the type known as instantaneous heater is indicated at 42, the steam pipes for supplying said heater being indicated at 43, an escape steam pipe 44, leading to a suitable trap. A pipe 45 leads from cold water system pipe 3 to the heater 42, and a pipe 46 leads from the heater 42 to the hot water system pipe 4. This heater is simply one of a type which employs steam to heat water for the hot water system of the building. Said heater may have a temperature regulator indicated diagrammatically at 47 to regulate the temperature of the water from the heater by thermostatically controlling the passage of steam through pipe 43 under the influence of the hot water flowing out through the pipe 46. A pipe 48 from the high pressure pipe 14 connects with the cold water system pipe 3, said pipe having a pressure-reducing valve 49 which may be of the type known as the "Mason" reducing valve.

We also illustrate another form of hot water heater at 50, there being two heaters of the vertical type connected by means of a branch pipe 51 with the cold water system pipe 3, the two heaters 50 being connected together and one of them being connected by pipe 52 with the steam pipe 2. The discharge steam may escape from pipe 53 to a suitable trap, not shown. A pipe 54 branched at one end and connected with both of the heaters 50 is connected with the hot water system pipe 4, and a pipe 55 connects the circulation pipe 5 with the two heater members 50 so as to provide for the slow circulation of hot water through the building system in the usual manner.

It will now be understood that while the different hydraulic apparatus discharge into the tank 1 instead of into a sewer, it being understood also that we do not limit ourselves to the number of particular kinds of hydraulic apparatus so delivering their passage water, the water stored in tank 1 is drawn therefrom by means of the steam pump and returned to the piping system from which it can be utilized for any of the other purposes, especially for supplying the bath rooms.

The check valve 11 prevents the water from being forced by the pump back into the main 9, and a check valve 56 in pipe 48 prevents water from being discharged back into the main 12. Said check valves may be of the type known as the "Jenkins" check valve. Other such check valves are employed at various points indicated at $x$. Various hand-controlled valves which may be of the type known as the "Jenkins gate valve," are employed in the system, as indicated at $y$.

We claim:—

1. The combination with a house system of piping, of a water-service pipe having a meter, and connected with said system at a point beyond said meter, a hydraulic apparatus supplied from said system, a receptacle for the outflow from said apparatus, and a pump for forcing the water from said receptacle back into the system pipes, means being provided for preventing the water from being pumped back to the service pipe.

2. The combination with a house system of piping, of a water-service pipe having a meter, and connected with said system at a point beyond said meter, a hydraulic apparatus supplied from said system, a receptacle for the outflow from said apparatus, and a pump for forcing the water from said receptacle back into the system.

3. The combination with a system of piping, of water-service pipes for different pressures connected with said system, each of said service pipes having a meter in advance of such connections, hydraulic apparatus supplied from said system, a receptacle for the outflow from said apparatus, and a pump for forcing the water from said receptacle back into the system pipes, means being provided for preventing the water from being pumped back to the service pipes.

In testimony whereof we have affixed our signatures, in presence of two witnesses.

JAMES G. MacDONALD.
WM. F. C. MacKAY.

Witnesses:
A. W. HARRISON,
P. W. PEZZETTI.